(12) United States Patent
Garg et al.

(10) Patent No.: US 7,865,908 B2
(45) Date of Patent: Jan. 4, 2011

(54) VM NETWORK TRAFFIC MONITORING AND FILTERING ON THE HOST

(75) Inventors: Pankaj Garg, Redmond, WA (US); Jeffrey Brian Kinsey, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 959 days.

(21) Appl. No.: 11/077,575

(22) Filed: Mar. 11, 2005

(65) Prior Publication Data

US 2006/0206300 A1  Sep. 14, 2006

(51) Int. Cl.
G06F 3/00 (2006.01)
G06F 9/44 (2006.01)
(52) U.S. Cl. .................................. 719/321; 718/1
(58) Field of Classification Search ............ 719/321; 718/1
See application file for complete search history.

(56) References Cited

U.S. PATENT DOCUMENTS

| | | | |
|---|---|---|---|
| 7,228,337 B1 * | 6/2007 | Bornstein et al. ........... 709/217 |
| 7,356,818 B2 * | 4/2008 | Carollo et al. ............. 718/102 |
| 7,478,173 B1 * | 1/2009 | Delco ........................ 709/250 |
| 2005/0182853 A1 * | 8/2005 | Lewites et al. ............. 709/238 |
| 2006/0070066 A1 * | 3/2006 | Grobman ..................... 718/1 |
| 2006/0195715 A1 * | 8/2006 | Herington ..................... 714/4 |

* cited by examiner

*Primary Examiner*—Li B Zhen
(74) *Attorney, Agent, or Firm*—Woodcock Washburn LLP

(57) ABSTRACT

A system and method is provided that enables older legacy guest operating systems like Windows NT 4.0 and Windows95® to take advantage of newly developed NDIS Intermediate (IM) drivers that support firewalls, quality of service, IP security, intrusion detection, and other functionality for monitoring/filtering incoming and outgoing network traffic in contemporary host operating systems such as Windows XP operating in a virtual machine (VM) environment. The invention thus makes such older legacy operating systems less susceptible to Internet viruses, and worms, network denial of service (DOS) attacks, and the like. For each Virtual Network Interface Card (VNIC) in a guest VM, a corresponding VNIC is created on the host OS, and a point to point connection is established between the guest and host VNICs. The NDIS IM drivers bind themselves on top of the host VNIC and effectively place themselves as a filter on the point to point connection.

18 Claims, 9 Drawing Sheets

VM NETWORK TRAFFIC MONITORING AND FILTERING ON THE HOST

FIELD OF THE INVENTION

The invention is directed to systems, apparatus, and methods for providing traffic monitoring and filtering of virtual machine (VM) network data on a host computer. More particularly, the present invention is directed to systems, apparatus, and methods for providing the advantages of NDIS IM drivers written for newer operating systems to legacy operating systems (OSes) that are hosted in a VM environment.

BACKGROUND OF THE INVENTION

One of the greatest threats to computer users today is malware, such as Internet viruses and worms, that target security holes in conventional operating system (OS) software. In recent years, software patches, security applications, and operating system upgrades have closed many of the security holes exploited by the malware developers. For example, malware protections, such as recently released Network Driver Interface Specification (NDIS) Intermediate (IM) drivers for a Windows operating system, provide features such as firewall, quality of service, IP security, and the like by monitoring and filtering the incoming and outgoing network traffic. Unfortunately, older operating systems like Windows NT 4.0, Windows 3.1 and Windows95® are not able to take advantage of the new NDIS IM drivers built for newer operating systems like Windows XP and Windows 2003. These legacy operating systems thus remain susceptible to Internet viruses and worms and network denial of service (DOS) attacks.

Due to the significant costs and business disruptions that would be incurred in upgrading the installed based of legacy operating systems users to newer, more secure, operating systems, it is likely that users of these legacy operating systems will continue to be vulnerable to malware for some time to come unless a technology path is provided that enables such users to maintain their legacy operating systems yet provide the most up-to-date malware protections. Virtual machine (VM) technology provides one possible technology path for protecting legacy operating systems. In conventional VM systems such as Virtual Server available from Microsoft Corporation, the legacy operating systems function as guests of a host operating system containing the up-to-date malware protections. Unfortunately, the legacy operating systems (guests) are not able to take advantage of the networking infrastructure of the host operating system and thus remain as susceptible to attack when run as a guest on a newer operating system like Windows XP or Windows 2003 as when run on real hardware. Moreover, even if solutions such as firewall, quality of service, IP security, and the like exists for a guest operating system, such solutions are run within the guest operating system and it is quite difficult to manage these solutions inside different guest operating systems.

FIG. 1 illustrates a conventional VM system 10 including a host OS 20 (e.g., Windows XP or Windows 2003) that emulates a legacy guest OS 30 (e.g., Windows 3.1, Windows NT 4.0, or Windows95®). As illustrated, the guest OS 30 communicates with the host OS 20 via a point-to-point (P2P) connection 40, such as a virtual Ethernet cable. The host OS 20 includes a physical network interface card (NIC) 21 that physically connects the host OS 20 to a data network such as the Internet for accepting network data traffic. A host OS 20 with malware protections such as an NDIS IM filter may also include Virtual Server NDIS IM driver 22 that provides one-to-one connectivity between the physical NIC 21 and the incoming and outgoing network traffic of the host OS 20. In the case of conventional Internet communications, the incoming/outgoing TCI/IP traffic 23 to/from applications within the host OS 20 pass through a host NDIS IM driver 24 for monitoring and/or filtering of the host network traffic. NDIS IM driver 24 is, in turn, connected to a port of the Virtual Server NDIS IM driver 22 via a virtual NIC (VNIC) 25. The Virtual Server NDIS IM driver 22 provides a one-to-one connection between the VNIC 25 and the physical NIC 21 to provide routing of network traffic coming from the host OS 20 and the guest OS 30.

As further illustrated in FIG. 1, the guest OS 30 includes a guest networking stack 31 that stacks communications requests to/from the guest OS 30. The communications generated by applications of the guest OS 30 pass through a VNIC 32, over the point-to-point (P2P) open connection, which may be a Virtual Ethernet cable (a shared memory or any other communication method between a guest and a host) 40, and into the Virtual Server NDIS IM driver 22 as illustrated. Typically, the VNIC 32 sends data to/from host OS 20 over the P2P open connection 40 following any appropriate Ethernet protocol. Unfortunately, this implementation also does not permit the guest OS 30 to access the filtering functionality of the NDIS IM driver 24; therefore, the guest OS 30 remains vulnerable to malware form the network traffic received via the physical NIC 21 and P2P connection 40.

As an illustration of the problem, suppose one were to wish to protect a Windows95® guest OS from Internet viruses when it is running inside a virtual machine on a Windows XP host OS. In the FIG. 1 system, the NDIS IM drivers 24 could not be accessed; therefore, the conventional solution would be to hack together a solution using things like Network Address Translation (NAT), which greatly limits the functionality of the guest OS. A solution is desired whereby the Windows95® guest OS would be able to use some of the firewall solutions (such as the ones implemented as NDIS IM drivers like Norton firewall) available on the Windows XP host to firewall the Windows95® guest network traffic.

As a further illustration, suppose one were to wish to provide IP security support for a Windows 3.1 (or OS2 or Linux OS) guest OS running inside a virtual machine on a Windows 2003 host OS. Once again, since the IP security drivers of the host OS 20 could not be accessed, it would not be possible to provide IP security support to the guest OS unless an IP security solution exists for the guest OS (i.e., Windows 3.1 in this example) and can be managed inside the guest OS.

A solution to these problems is desired that would provide an infrastructure to support monitoring and filtering of guest network traffic by the host's NDIS IM drivers. This will give users the ability to protect legacy operating systems from Internet viruses and worms when run inside a virtual machine on a newer operating system such as Windows XP or Windows 2003 and to manage the different solutions like firewall, quality of service, IP security, and the like for different guests at one place (e.g., the host) instead of managing them inside individual guests. The present invention provides such a solution.

SUMMARY OF THE INVENTION

The above-mentioned problems are addressed by a computer system that enables a guest operating system (OS) to access network infrastructure of a host OS on which the guest OS is being emulated. The guest OS communicates via at least one virtual network interface card (VNIC) and a point-to-point connection, such as a virtual Ethernet cable, to a corresponding VNIC of the host OS. The host VNIC is, in turn, connected to network traffic via a physical NIC of the host computer. At least one host IM driver for accessing network infrastructure of the host OS is disposed in the point-to-point connection between the host VNIC and the guest VNIC so that the guest OS may access the host's network infrastructure. A Network Virtualization NDIS MUX IM driver is also provided between the physical NIC and the host VNIC to route network traffic to/from one or more guest OSes and application programs running on the host OS that need to share the physical NIC. In addition, a protocol driver is provided between the host VNIC and the guest VNIC for choosing a communication protocol by which the host VNIC and the guest VNIC may communicate over the point-to-point connection.

In exemplary embodiments, one or more legacy guest OSes such as Windows95®, Windows NT 4.0, and Windows 3.1 are emulated on contemporary host OSes such as Windows XP and Windows XP 2003 that contain at least one NDIS IM driver bound to a VNIC of the Network Virtualization NDIS MUX IM driver. Such NDIS IM drivers may include any available drivers for network capabilities including, for example, IP security drivers, firewall drivers, intrusion detection drivers, load balancing drivers, quality of service drivers, and VLAN support drivers. Two or more of such host IM drivers may be layered on each other in the point-to-point connection between the host VNIC and the guest VNIC so as to provide multiple network services to the guest OS.

The scope of the invention also includes a method of filtering and/or monitoring incoming and outgoing network traffic to/from a guest OS being emulated on a host OS. Such a method in accordance with the invention includes the steps of providing at least one virtual network interface card (VNIC) of the guest OS that communicates via a point-to-point connection to a corresponding VNIC of the host OS and connecting the VNIC of the host OS to network traffic via a physical NIC of the host computer. The guest OS is provided access to the filtering and/or monitoring network infrastructure of the host OS for filtering and/or monitoring the incoming and outgoing network traffic to/from the guest operating system by disposing at least one host IM driver for accessing the filtering and/or monitoring network infrastructure in the point-to-point connection between the host VNIC and the guest VNIC. Network traffic is routed to/from the physical NIC to/from respective host VNICs created by the Network Virtualization NDIS MUX IM driver.

The invention also includes a computer readable medium including software that performs the methods of the invention when read by a suitable host computer system. Additional characteristics of the invention will be apparent to those skilled in the art based on the following detailed description.

BRIEF DESCRIPTION OF THE DRAWINGS

The systems and methods for extending the functions of NDIS IM drivers to legacy operating systems that are hosted in a VM environment in accordance with the present invention are further described with reference to the accompanying drawings, in which.

DETAILED DESCRIPTION OF ILLUSTRATIVE EMBODIMENTS

Overview

Figure 1:
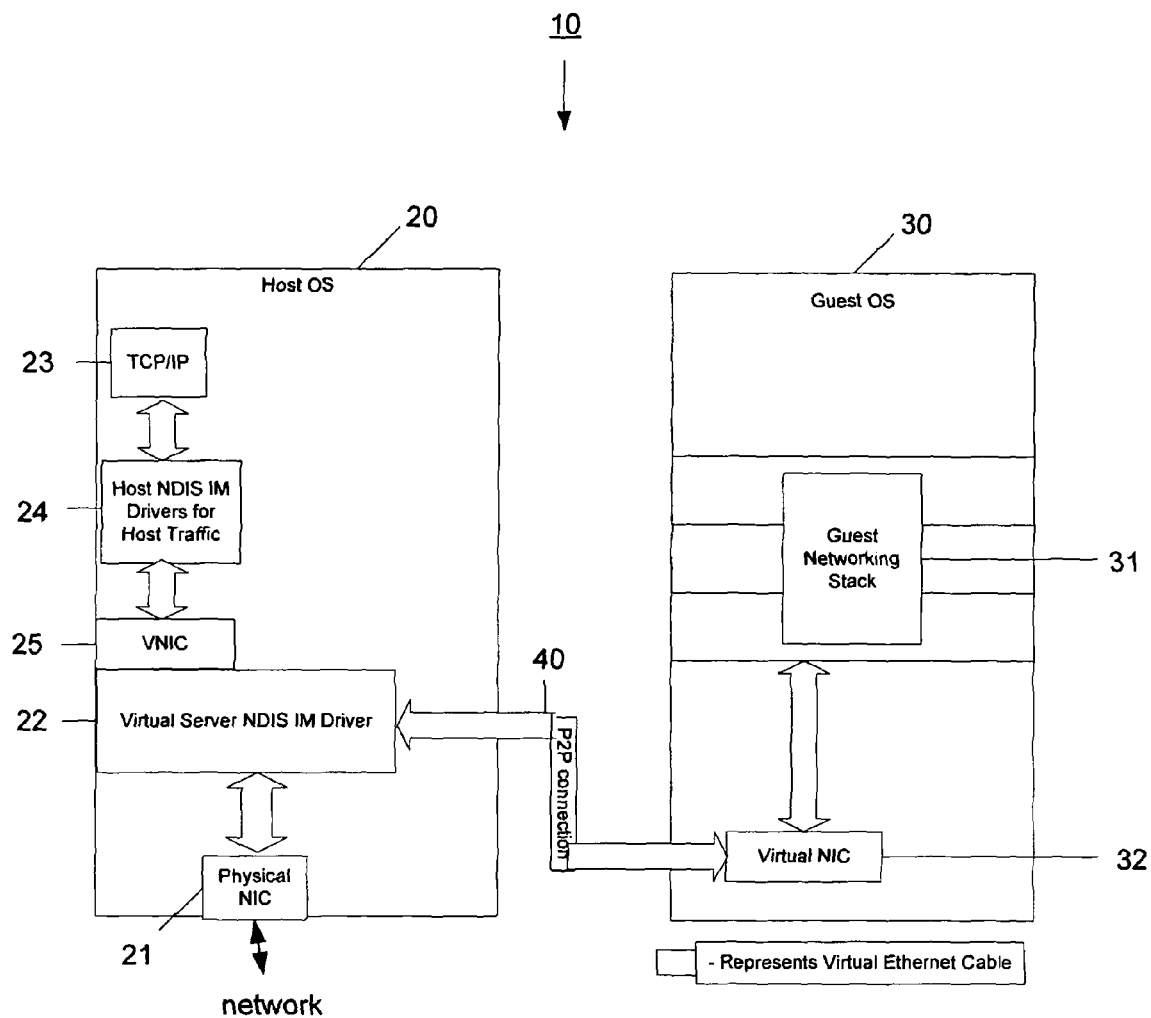
FIG. 1 illustrates a conventional virtual machine (VM) system in which a guest OS communicates with a host OS via a virtual Ethernet cable but cannot access the traffic filtering capabilities of the host OS.

The present invention provides systems and methods for providing the advantages of host NDIS IM drivers that provide traffic monitoring and filtering functions to legacy operating systems that are being hosted in a VM environment.

The invention enables guest OSes operating on a host OS in a VM environment to take advantage of traffic monitoring and filtering functions operating on the host OS. For example, in the examples given above, the invention would enable the Windows95® guest OS to receive the anti-virus protections available on the Windows XP host and would enable the Windows 3.1 guest OS to use the IP security solution available on the Windows 2003 host OS for the network traffic of the guest OS.

In particular embodiments, the invention provides the ability to independently monitor and filter network traffic of a guest OS using NDIS IM drivers available on a host OS. For example:

1. firewall support may be provided for a guest OS using firewalls available on the host OS;

2. IP security support may be provided for a guest OS using IP security solutions available on the host OS;

3. intrusion detection software built for the host OS may be accessed by the guest OS; and 4. other network capabilities for which drivers written for the host are available (or may become available in the future), such as quality of service support, load balancing, VLAN support, network traffic monitoring, anti-virus solutions, and the like, may be accessed by the guest OS.

Other more detailed aspects of the invention are described below, but first, the following description provides a general overview of and some common vocabulary for virtual machines and associated terminology as the terms have come to be known in connection with operating systems and the host processor ("CPU") virtualization techniques. In doing so, a set of vocabulary is set forth that one of ordinary skill in the art may find useful for the description that follows of the apparatus, systems and methods for extending NDIS IM drivers to legacy operating systems in a VM environment in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the Guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC <-> x86), two approaches could be used: instruction-by-instruction emulation (relatively slow) or translation from the Guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating systems are virtualized and thus an exemplary scenario in accordance with the invention would be emulation of a Windows95®, Windows98®, Windows 3.1, or Windows NT 4.0 operating system on a Virtual Server available from Microsoft Corporation. In various embodiments, the invention thus describes systems and methods for controlling Guest access to some or all of the underlying physical resources (memory, devices, etc.) of the host computer, including the NDIS IM drivers.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 2A.

Figure 2A:
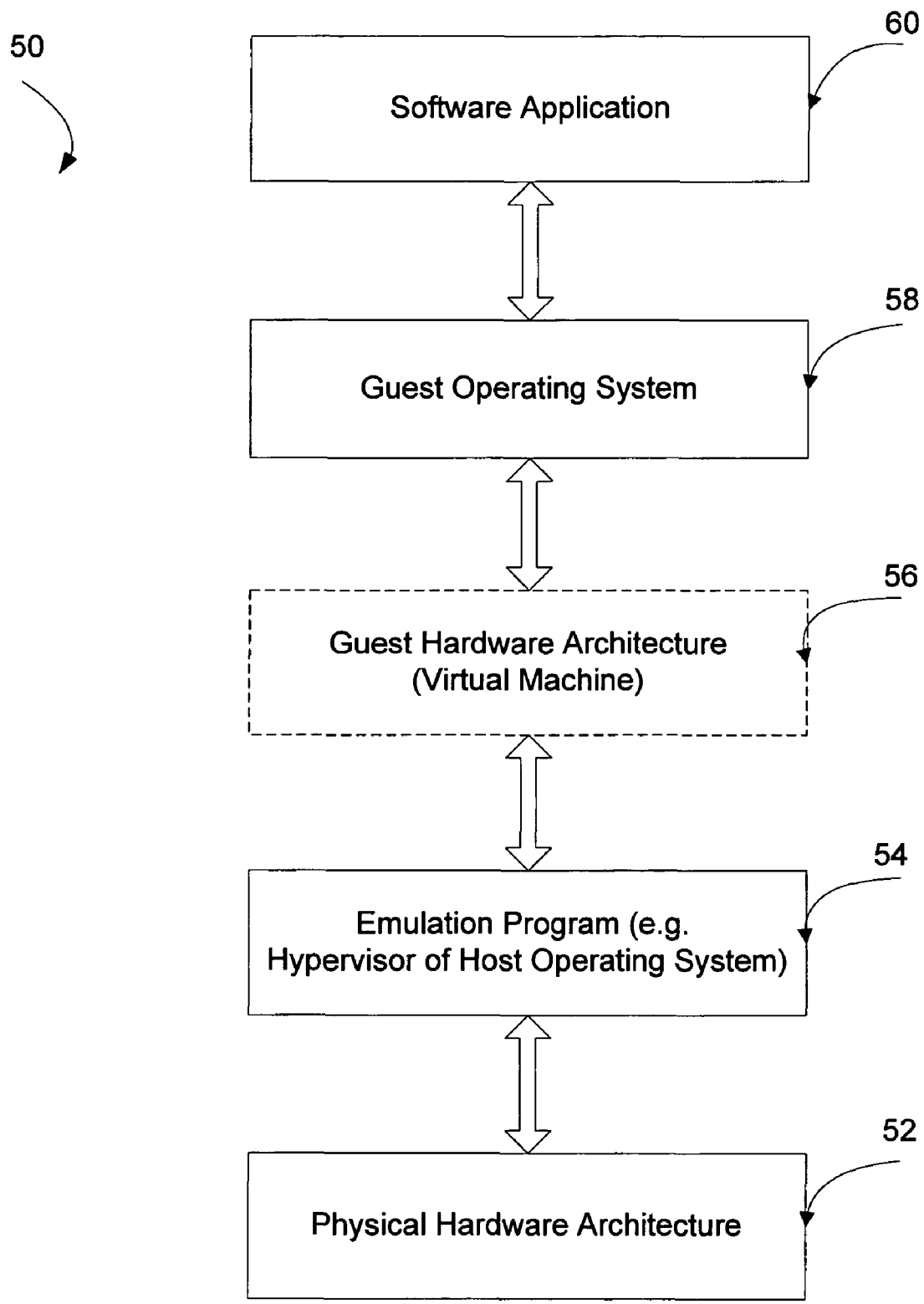
FIG. 2A is a block diagram representing the logical layering of the hardware and software architecture for an emulated operating environment in a computer system.

FIG. 2A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by said emulation program 54). A guest operating system 58 executes on the guest hardware architecture 56, and software application 60 runs on the guest operating system 58. In the emulated operating environment of FIG. 2A—and because of the operation of emulation program 54—software application 60 may run in computer system 50 even if software application 60 is designed to run on an operating system that is generally incompatible with the host operating system and hardware architecture 52.

Figure 2B:
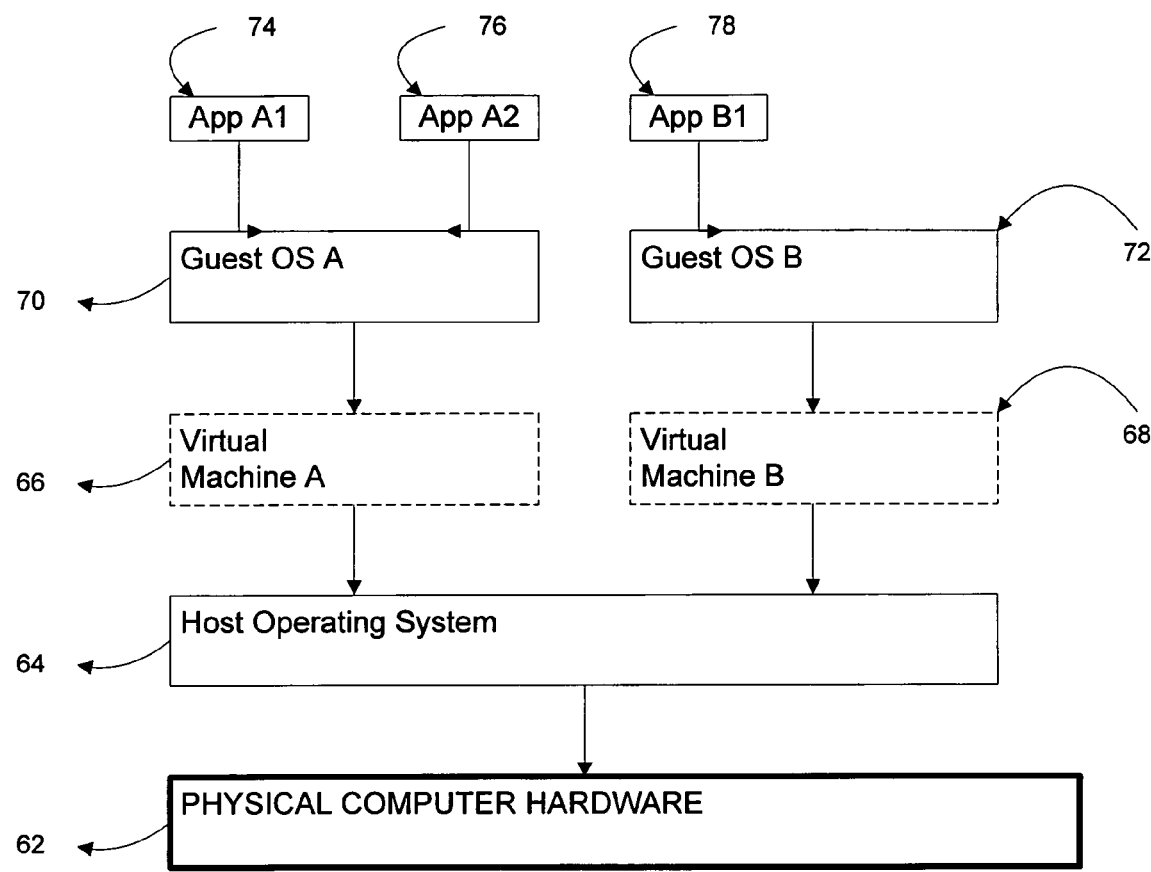
FIG. 2B is a block diagram representing a virtualized computing system wherein the emulation is performed by the host operating system (either directly or via a hypervisor)

FIG. 2B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 2B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 2B, it is important to note that VM A 66 and VM B 68 (which are shown in broken lines) are virtualized computer hardware representations that exist only as software constructions and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 2C:
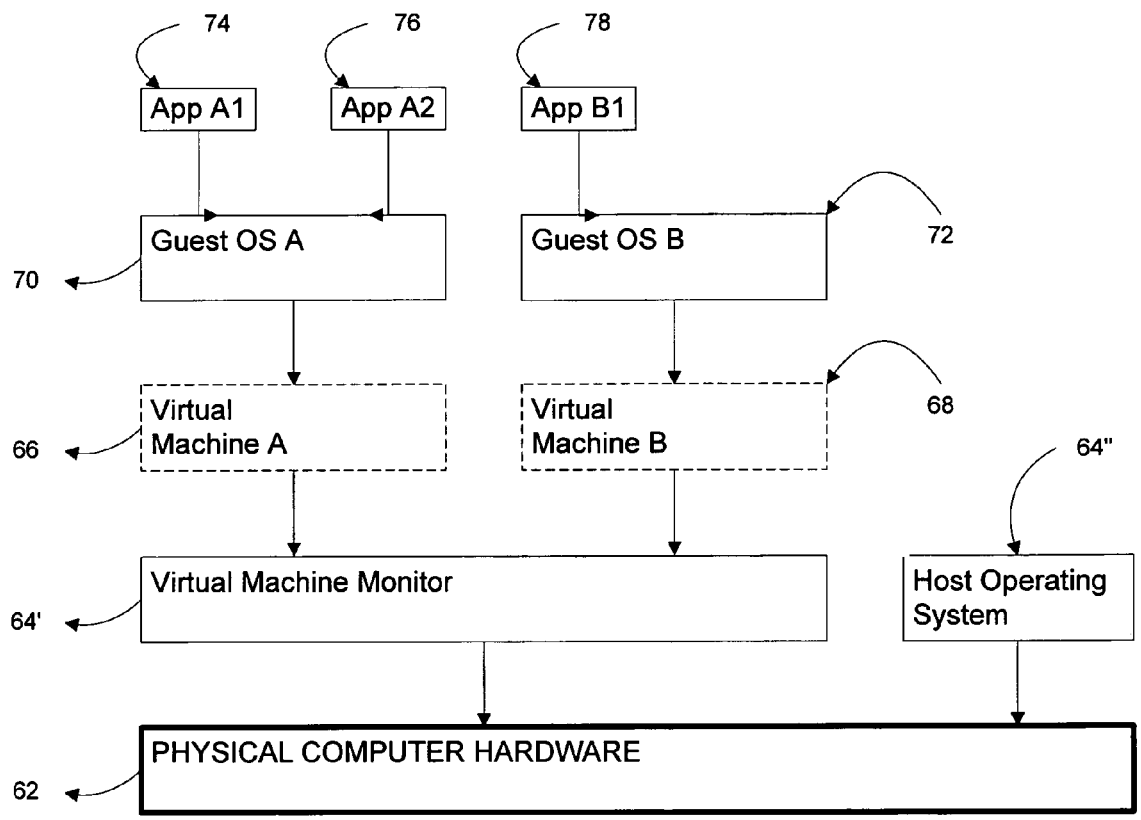
FIG. 2C is a block diagram representing an alternative virtualized computing system wherein the emulation is performed by a virtual machine monitor running side-by-side with a host operating system.

FIG. 2C illustrates an alternative virtualized computing system wherein the emulation is performed by a virtual machine monitor (VMM) 64' running alongside the host operating system 64". For certain embodiments the VMM 64' may be an application running above the host operating system 64" and interacting with the physical computer hardware 62 only through the host operating system 64". In other embodiments, and as shown in FIG. 2C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with said host operating system 64" insofar as coordinating use of the computer hardware 62 and avoiding conflicts and the like).

All of these variations for implementing the virtual machine are anticipated to form alternative embodiments of the present invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Figure 3:
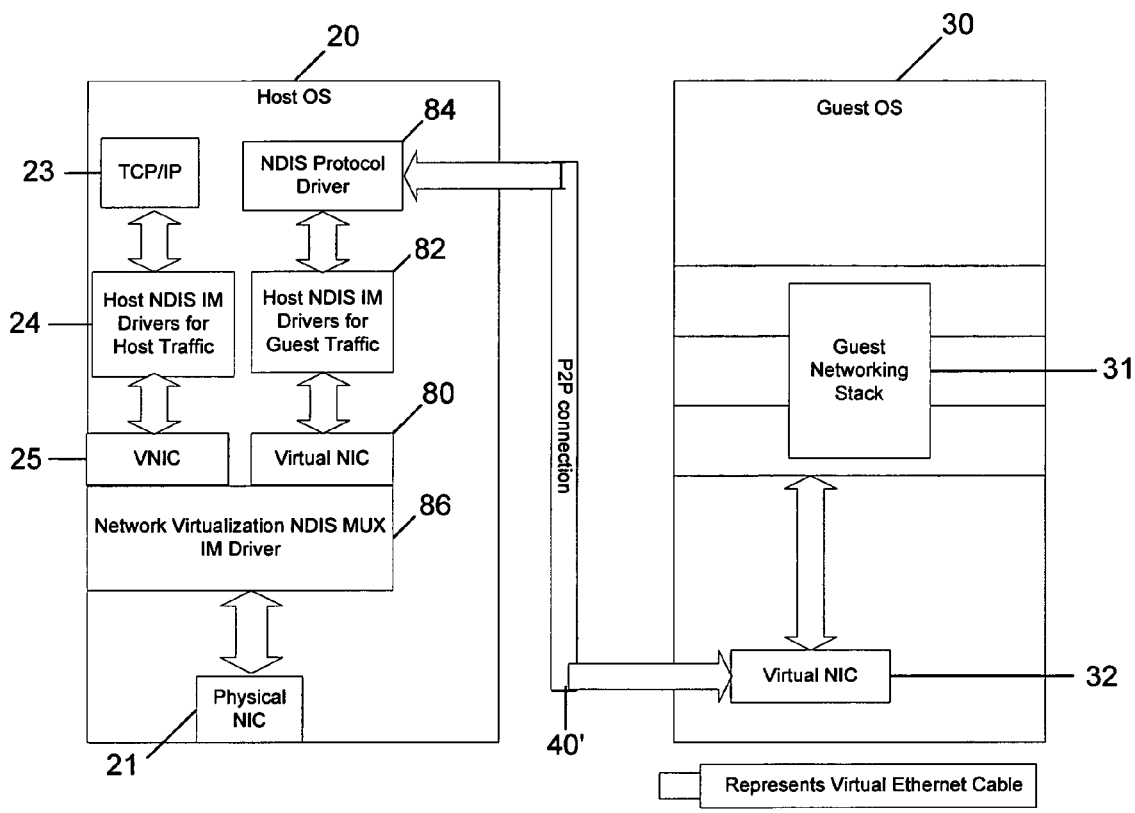
FIG. 3 illustrates an embodiment of the invention whereby the guest OS may access host NDIS IM drivers for filtering guest network traffic.

Extending Networking Traffic Monitoring and Filtering on the Host to Virtualized OSes A virtual machine may have a number of virtual Ethernet NICs (e.g., VNIC 32 in FIG. 1) inside a guest OS 30 for enabling communication with the host OS 20. In accordance with the invention, for each VNIC 32 of the guest OS 30, a corresponding VNIC 80 is created on the host OS 20 as illustrated in FIG. 3. Each such VNIC 80 may have its own properties and may use any physical NIC 21 available to the host OS 20. Then, instead of providing a point to point connection between VNIC 32 and an NDIS IM filter driver 22 as in prior art FIG. 1, a point to point connection 40' is created between the VNIC 32 of the guest OS 30 and the VNIC 80 of the host OS 20. This creates a virtual Ethernet cable between the VNIC 32 and VNIC 80 whereby all outgoing network traffic from the guest OS 30 goes to the VNIC 80 on the host OS 20 and all the incoming network traffic to the guest OS 30 first goes to the VNIC 80 on the host OS 20 before being sent to the guest OS 30 over the virtual Ethernet cable 40'.

Figure 5:
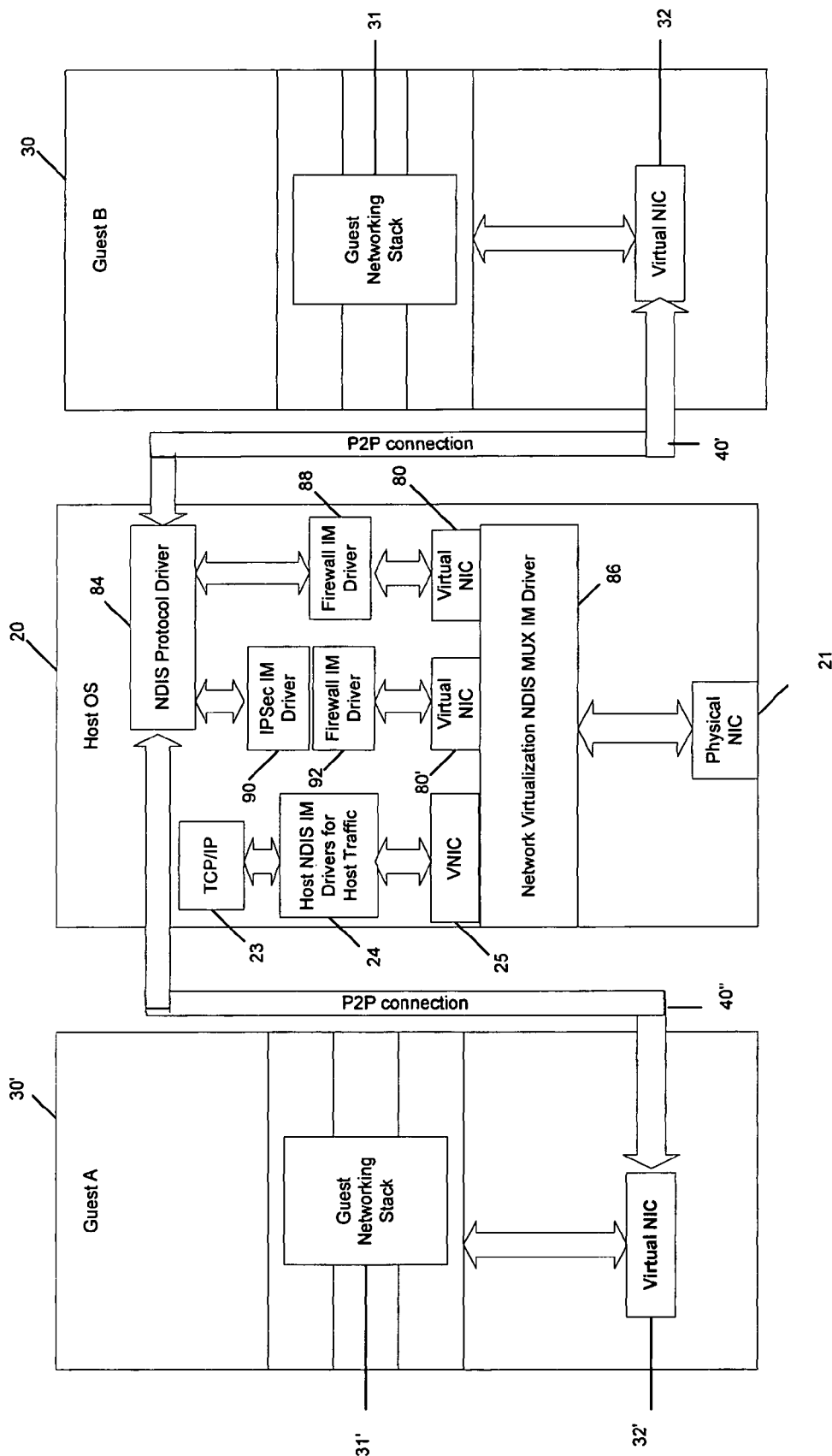
FIG. 5 illustrates an embodiment of the invention whereby multiple guest OSes may selectively access an IP security IM driver and firewall IM drivers via respective P2P connections.

As illustrated in FIG. 3, this arrangement enables the NDIS IM drivers 82 available on the host (and written for the host) to bind themselves on top of the VNIC 80 on the side of the host OS 20 and to effectively place themselves as a filter on the virtual Ethernet cable 40' between the host VNIC 80 and guest VNIC 32. An NDIS protocol driver 84 provides any necessary protocol translations for enabling the communications over the virtual Ethernet cable 40'. As will be appreciated by those skilled in the art, NDIS protocol driver 84 in a Windows networking architecture chooses the Ethernet protocol implemented at the VNIC 32 of the guest OS 30 suitable for communication over the proprietary interface of the P2P connection 40'. In addition, the Virtual Server NDIS IM driver 22 as in prior art FIG. 1 is replaced by an Network Virtualization NDIS MUX IM driver 86 that includes a software switch implementation to effectively act as a software router that enables one or more VMs (guest OSes) and the host's application programs to dynamically share the physical NIC 21 and also provide routing of network traffic to/from host's application programs to/from one or more VMs. As illustrated in the embodiment of FIG. 5, different driver modules may be provided at each such VNIC 80 of the Network Virtualization NDIS MUX IM driver 86 to provide dynamic functionality. As a result of this arrangement, the network drivers or filters of the host OS 20 will receive all the traffic coming from and going to the guest OS 30, thereby extending the functionality of the host's network drivers and filters to the guest OS 30.

Figure 4:
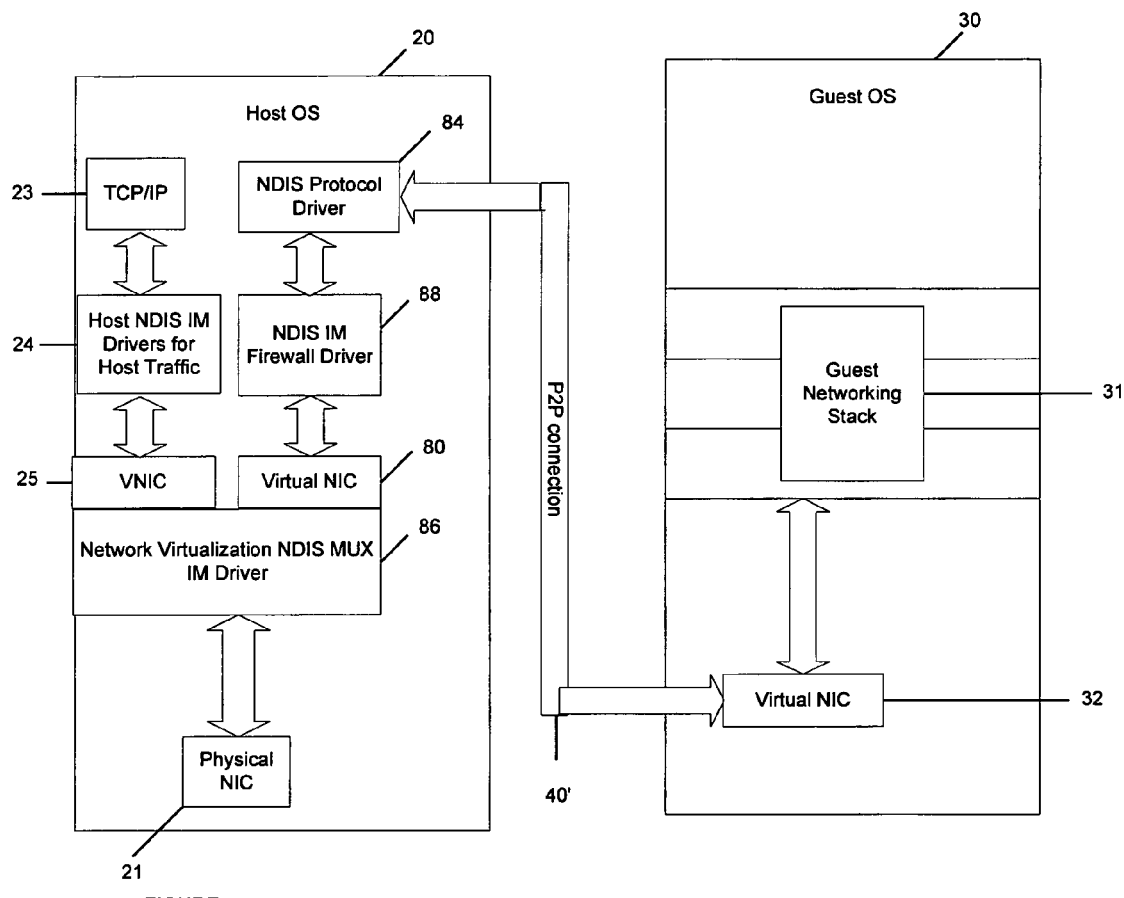
FIG. 4 illustrates an embodiment of the invention whereby the guest OS may access a host NDIS IM firewall driver for isolating guest network traffic.

FIG. 4 illustrates an embodiment of the invention in which firewall support is provided by the host OS 20 for a legacy guest OS 30. This embodiment is very similar to the embodiment of FIG. 3 except that NDIS IM firewall driver 88 is provided between the VNIC 80 on the host OS 20 and the NDIS protocol driver 84. This embodiment enables the NDIS IM firewall driver 88 to firewall the network traffic going to the guest OS 30.

FIG. 5 illustrates an embodiment of the invention in which multiple guest OSes 30 and 30' may selectively access an IP security IM driver 90 and firewall IM driver 92 or firewall IM driver 88 via respective P2P connections 40' and 40". This embodiment illustrates how different guest OSes 30 and 30' may selectively access different combinations of network IM driver modules available on the host OS 20 and how respective IM driver modules can layer on top of each other. As illustrated, multiple VNICs 80 and 80' corresponding to VNICs 32 and 32', respectively, are made available for the respective guest OSes. Switching capabilities within the Network Virtualization NDIS MUX IM driver 86 enable the network communications to/from the respective guest OSes 30, 30' to follow different assigned paths so as to provide access to different combinations of network drivers or layers of network drivers and hence different combinations of filtering and monitoring functions. Those skilled in the art will appreciate that, as appropriate, a guest OS may be switched to a different combination of IM driver modules without any changes to the guest OS.

As will be appreciated by those skilled in the art, the ability of the host OS 20 to provide a filter for the network traffic coming out and going to one or more guest OSes enables the guest OSes to access certain very useful services of the network drivers of the host OS 20 without going to the network layer and without any requirements for any changes in the guest OSes. For example, the network drivers of the host can act as a firewall, provide intrusion detection support, provide IP security by attaching security information, provide load balancing between two guest OSes, provide quality of service, provide VLAN support, and any other network capability for which drivers are available or may be written for the host OS 20.

Exemplary Networked and Distributed Environments

One of ordinary skill in the art can appreciate that the invention can be implemented in connection with any suitable host computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with virtualizing a guest OS in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 6A:
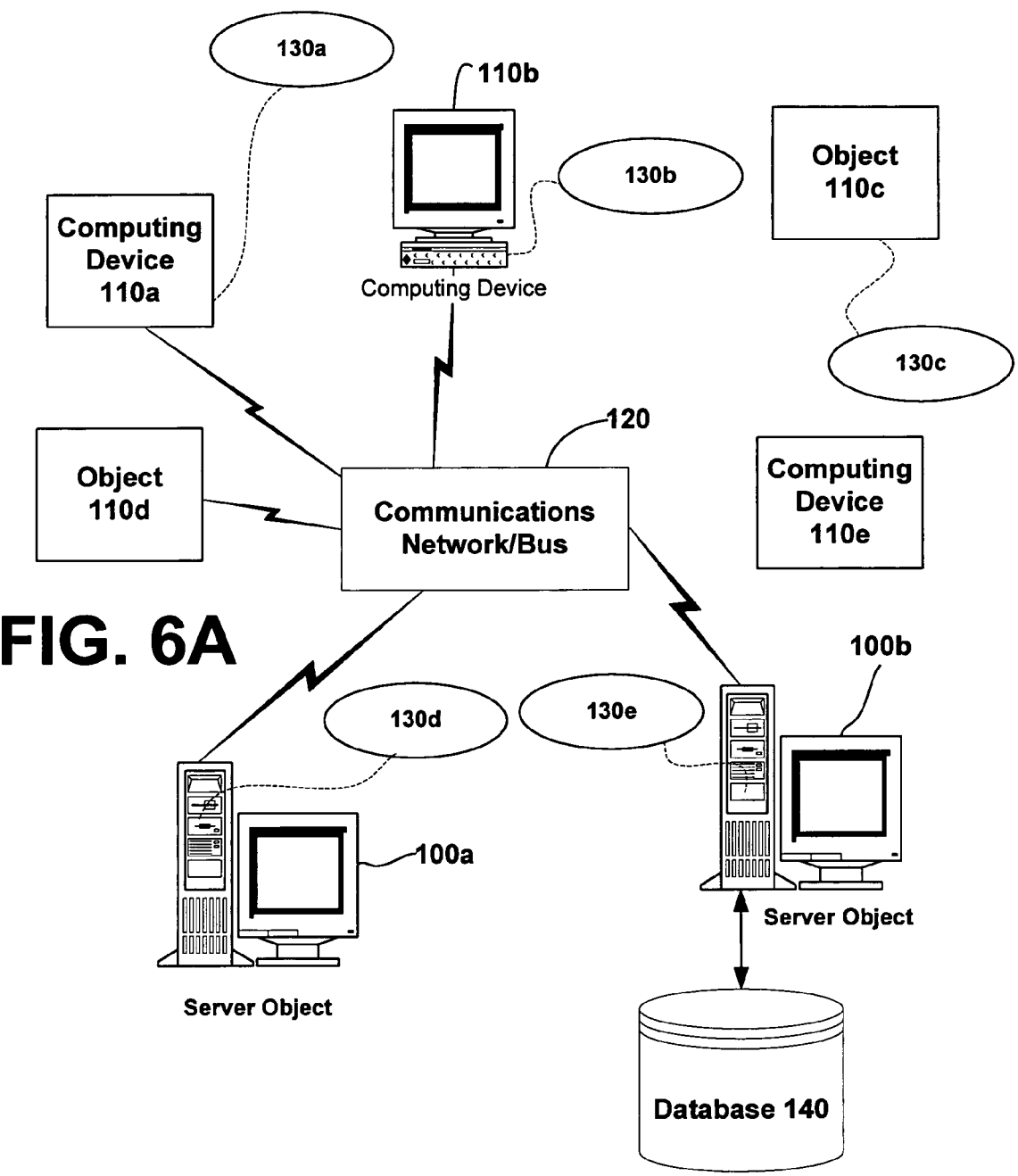
FIG. 6A is a block diagram representing an exemplary network environment having a variety of computing devices in which the present invention may be implemented.

FIG. 6A provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 120. This network may itself comprise other computing objects and computing devices that provide services to the system of FIG. 6A, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the virtualization processes of the invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6A, computers 110a, 110b, etc. can be thought of as clients and computers 100a, 100b, etc. can be thought of as the server where server 100a, 100b, etc. maintains the data that is then replicated in the client computers 110a, 110b, etc., although any computer can be considered a client, a server, or both, depending on the circumstances. Any of these computing devices may be processing data or requesting services or tasks that may implicate an implementation of the architectures of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture (s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 6A illustrates an exemplary networked or distributed environment, with a server in communication with client computers via a network/bus, in which the present invention may be employed. In more detail, a number of servers 100a, 100b, etc., are interconnected via a communications network/bus 120, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like. It is thus contemplated that the present invention may apply to any computing device in connection with which it is desirable to implement guest interfaces and operating systems in accordance with the invention.

In a network environment in which the communications network/bus 120 is the Internet, for example, the servers 100a, 100b, etc. can be Web servers with which the clients 110a, 110b, 110c, 110d, 110e, etc. communicate via any of a number of known protocols such as HTTP. Servers 100a, 100b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 120, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 100*a*, 100*b*, etc. may be equipped with various application program modules or objects 130 and with connections or access to various types of storage elements or objects, across which files or data streams may be stored or to which portion(s) of files or data streams may be downloaded, transmitted or migrated. Any one or more of computers 100*a*, 100*b*, 110*a*, 110*b*, etc. may be responsible for the maintenance and updating of a database 140 or other storage element, such as a database or memory 140 for storing data processed according to the invention. Thus, the present invention can be utilized in a computer network environment having client computers 110*a*, 110*b*, etc. that can access and interact with a computer network/bus 120 and server computers 100*a*, 100*b*, etc. that may interact with client computers 110*a*, 110*b*, etc. and other like devices, and databases 140.

Exemplary Computing Device

Figure 6B:
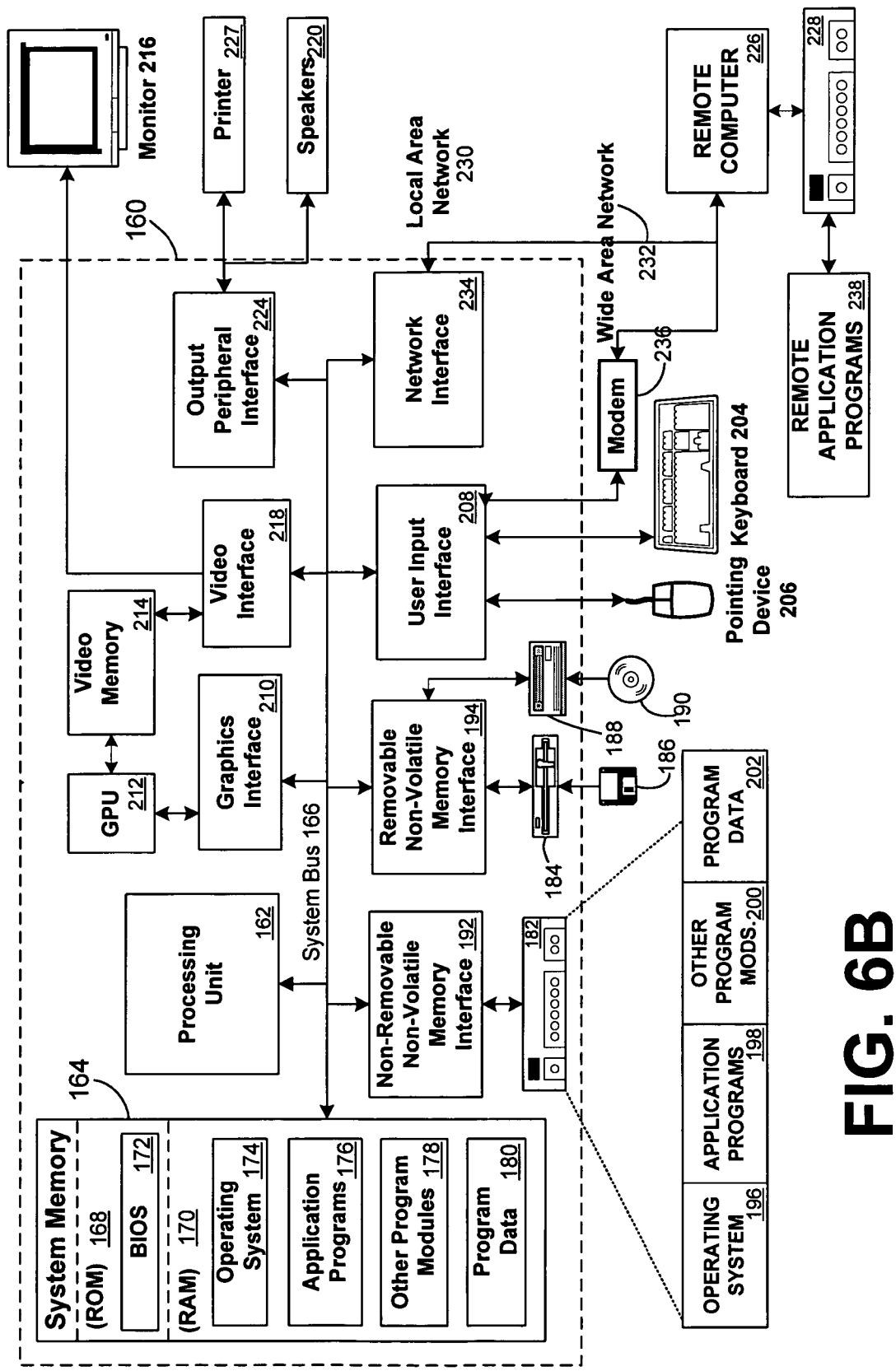
FIG. 6B is a block diagram representing an exemplary non-limiting host computing device in which the present invention may be implemented.

FIG. 6B and the following discussion are intended to provide a brief general description of a suitable host computing environment in connection with which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 6B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 6B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCD) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during startup, is typically stored in ROM 168. RAM 170 typically contains data and/or program modules that are immediately accessible to and/or presently being operated on by processing unit 162. By way of example, and not limitation, FIG. 6B illustrates operating system 174, application programs 176, other program modules 178, and program data 180.

The computer 160 may also include other removable/non-removable, volatile/nonvolatile computer storage media. By way of example only, FIG. 6B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 6B provide storage of computer readable instructions, data structures, program modules and other data for the computer 160. In FIG. 6B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 6B. The logical connections depicted in FIG. 6B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 6B illustrates remote application programs 238 as residing on memory device 228. It will be appreciated that the network connections shown are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows architecture. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer system that enables a first guest operating system (OS) and a second guest OS to access a network by way of a host OS, comprising:
    a physical network interface capable of communicating over a network connection;
    at least one processor coupled to at least one memory, the at least one processor capable of executing program instructions stored in the at least one memory, the program instructions comprising instructions for the first guest OS, the second guest OS, and the host OS;
    the first guest OS comprising a first guest virtual network interface card (VNIC), the first guest VNIC providing network services to the first guest OS;
    the second guest OS comprising a second guest VNIC, the second guest VNIC providing network services to the second guest OS;
    the host OS comprising a first host VNIC, a second host VNIC, and a third host VNIC, the first, second and third host VNICs being in communication with network traffic via the physical network interface,
    the third host VNIC sending a first network traffic to an application executing within the host OS without sending the first network traffic to a protocol driver of the host OS;
    the host OS further comprising the protocol driver disposed in the a first point-to-point connection between the first guest VNIC and the first host VNIC, and disposed in a second point-to-point connection between the second guest VNIC and the second host VNIC,
    the protocol driver selecting a communication protocol for the first guest VNIC and the first host VNIC to communicate over the first point-to-point connection, the protocol driver choosing a communication protocol for the second guest VNIC and the second host VNIC to communicate over the second point-to-point connection,
    the host OS further comprising a first host intermediate (IM) driver disposed in the first point-to-point connection between the protocol driver and the first host VNIC, the first host IM driver filtering or monitoring network traffic sent between the first host VNIC and the first guest VNIC; and
    the host OS further comprising a second host intermediate (IM) driver disposed in the second point-to-point connection between the protocol driver and the second host VNIC, the second host IM driver filtering or monitoring network traffic sent between the second host VNIC and the second guest VNIC.

2. The computer system of claim 1, wherein the first point-to-point connection comprises a virtual Ethernet connection.

3. The computer system of claim 1, further comprising a mux driver between the physical network interface and the first, second and third host VNICs, the mux driver including a software switch that enables the first guest OS, the second guest OS, and the application to share the physical network interface.

4. The computer system of claim 3, wherein the first host IM driver is bound to a VNIC of the mux driver.

5. The computer system of claim 1, wherein the filtering or monitoring by the first host IM driver comprises performing the function of at least one of an IP security driver, a firewall driver, an intrusion detection driver, a load balancing driver, a quality of service driver, and a VLAN support driver.

6. The computer system of claim 1, wherein a third host IM driver is disposed between the first host IM driver and the first host VNIC.

7. The computer system of claim 1, wherein the first guest operating system comprises one of Windows95®, Windows98®, Windows NT 4.0, and Windows 3.1, and the host operating system comprises one of Windows XP and Windows XP 2003.

8. The computer system of claim 1, wherein the first host IM driver performs a different type of filtering or monitoring network traffic than the second host IM driver performs.

9. A method for enabling a first guest operating system (OS) and a second guest OS to access a network by way of a host OS on a computer, comprising:

executing, by the computer, the first guest OS, comprising a first guest virtual network interface card (VNIC), said the first guest VNIC providing network services to the first guest OS;

executing, by the computer, the second guest OS, comprising a second guest VNIC, the second guest VNIC providing network services to the second guest OS;

executing, by the computer, the host OS comprising a first host VNIC, a second host VNIC, and a third host VNIC, the first, second and third host VNICs being in communication with network traffic via a physical network interface, receiving a first network traffic at the first host VNIC across a first point-to-point connection between the first host VNIC and the first guest VNIC, the first network traffic being originated by the first guest VNIC, the first network traffic having passed through a protocol driver disposed in the first point-to-point connection, the first network traffic having been received according to a first communication protocol, the protocol driver having selected the first communication protocol for the first guest VNIC and the first host VNIC to communicate over the first point-to-point connection, a first host intermediate (IM) driver, disposed in the first point-to-point connection between the protocol driver and the first host VNIC, having filtered or monitored the first network traffic;

sending the first network traffic to the physical network interface such that the first network traffic is transmitted to the network;

receiving a second network traffic at the second host VNIC across a second point-to-point connection between the second host VNIC and the second guest VNIC, the second network traffic being originated by the second guest VNIC, the second network traffic having been passed through the protocol driver, the protocol driver being disposed in the second point-to-point connection, the second network traffic having been received according to a second communication protocol, the protocol driver having selected the second communication protocol for the second guest VNIC and the second host VNIC to communicate over the second point-to-point connection, a second host intermediate (IM) driver, disposed in the second point-to-point connection between the protocol driver and the second host VNIC, having filtered or monitored the first network traffic;

sending the second network traffic to the physical network interface such that the second network traffic is transmitted to the network;

receiving by the computer a third network traffic to an application executing within the host OS and from the third host VNIC, without sending the third network traffic to a protocol driver of the host OS; and sending the third network traffic to the physical network interface such that the third network traffic is transmitted to the network.

10. The method of claim 8, wherein the first point-to-point connection comprises a virtual Ethernet connection.

11. The method of claim 8, wherein said the filtering or monitoring by the first host IM driver comprises performing the function of at least one of an IP security driver, a firewall driver, an intrusion detection driver, a load balancing driver, a quality of service driver, and a VLAN support driver.

12. The method of claim 8, wherein receiving the first network traffic at the first host VNIC across the point-to-point connection between the first host VNIC and the first guest VNIC includes:

receiving the first network traffic after a third host intermediate (IM) driver, disposed in the first point-to-point connection between the protocol driver and the first host VNIC, has filtered or monitored the first network traffic.

13. The method of claim 8, wherein the filtering or monitoring performed by the first host IM driver differs from the filtering or monitoring network traffic performed by the second host IM driver.

14. A computer-readable storage medium for enabling a first guest operating system (OS) and a second guest OS to access a network by way of a host OS on a computer, bearing computer-readable instructions, that when executed on the computer, cause the computer to perform operations comprising:

executing, by the computer, the first guest OS, comprising a first guest virtual network interface card (VNIC), said the first guest VNIC providing network services to the first guest OS;

executing, by the computer, the second guest OS, comprising a second guest VNIC, the second guest VNIC providing network services to the second guest OS;

executing, by the computer, the host OS comprising a first host VNIC, a second host VNIC, and a third host VNIC, the first, second and third host VNICs being in communication with network traffic via a physical network interface, receiving a first network traffic at the first host VNIC across a first point-to-point connection between the first host VNIC and the first guest VNIC, the first network traffic being originated by the first guest VNIC, the first network traffic having passed through a protocol driver disposed in the first point-to-point connection, the first network traffic having been received according to a first communication protocol, the protocol driver having selected the first communication protocol for the first guest VNIC and the first host VNIC to communicate over the first point-to-point connection, a first host intermediate (IM) driver, disposed in the first point-to-point connection between the protocol driver and the first host VNIC, having filtered or monitored the first network traffic;

sending the first network traffic to the physical network interface such that the first network traffic is transmitted to the network;

receiving a second network traffic at the second host VNIC across a second point-to-point connection between the second host VNIC and the second guest VNIC, the second network traffic being originated by the second guest VNIC, the second network traffic having been passed through the protocol driver, the protocol driver being disposed in the second point-to-point connection, the second network traffic having been received according to a second communication protocol, the protocol driver having selected the second communication protocol for the second guest VNIC and the second host VNIC to communicate over the second point-to-point connection, a second host intermediate (IM) driver, disposed in the second point-to-point connection between the protocol driver and the second host VNIC, having filtered or monitored the first network traffic;

sending the second network traffic to the physical network interface such that the second network traffic is transmitted to the network;

receiving by the computer a third network traffic to an application executing within the host OS and from the third host VNIC, without sending the third network traffic to a protocol driver of the host OS; and sending the third network traffic to the physical network interface such that the third network traffic is transmitted to the network.

15. The computer-readable storage medium of claim 13, wherein the first point-to-point connection comprises a virtual Ethernet connection.

16. The computer-readable storage medium of claim 13, wherein said the filtering or monitoring by the first host IM driver comprises performing the function of at least one of an IP security driver, a firewall driver, an intrusion detection driver, a load balancing driver, a quality of service driver, and a VLAN support driver.

17. The computer-readable storage medium of claim 13, wherein receiving the first network traffic at the first host VNIC across the point-to-point connection between the first host VNIC and the first guest VNIC includes:

receiving the first network traffic after a third host intermediate (IM) driver, disposed in the first point-to-point connection between the protocol driver and the first host VNIC, has filtered or monitored the first network traffic.

18. The computer-readable storage medium of claim 13, wherein the filtering or monitoring performed by the first host IM driver differs from the filtering or monitoring network traffic performed by the second host IM driver.

\* \* \* \* \*